United States Patent [19]
Janssen et al.

[11] Patent Number: 6,007,416
[45] Date of Patent: Dec. 28, 1999

[54] METHOD AND APPARATUS FOR FILLETING THE BODY OF SLAUGHTERED POULTRY

[75] Inventors: Petrus C. H. Janssen, Wilbertoord; Adrianus J. van den Nieuwelaar, Gemert, both of Netherlands

[73] Assignee: Stork PMT B.V., Netherlands

[21] Appl. No.: 08/503,978

[22] Filed: Jul. 19, 1995

[30] Foreign Application Priority Data

Jul. 21, 1994 [NL] Netherlands ............................ 9401198

[51] Int. Cl.⁶ ..................................................... A22C 21/00
[52] U.S. Cl. ......................... 452/135; 452/136; 452/165; 452/166; 452/169
[58] Field of Search ..................................... 452/135, 136, 452/148, 165, 166, 167, 169, 160

[56] References Cited

U.S. PATENT DOCUMENTS

| | | |
|---|---|---|
| 4,477,942 | 10/1984 | Martin et al. . |
| 4,648,155 | 3/1987 | Burnett . |
| 4,648,156 | 3/1987 | Meyn ........................ 452/136 |
| 4,827,570 | 5/1989 | Scheier et al. . |
| 4,873,746 | 10/1989 | Scheier et al. ............................ 452/148 |
| 4,937,918 | 7/1990 | Martin . |
| 4,993,114 | 2/1991 | Meyer et al. ............................ 452/136 |
| 5,098,337 | 3/1992 | Landt et al. ............................. 452/135 |
| 5,194,035 | 3/1993 | Dillard . |
| 5,269,722 | 12/1993 | Diesing et al. ........................... 452/135 |
| 5,312,291 | 5/1994 | van den Nieuwelaar et al. ...... 452/165 |
| 5,314,374 | 5/1994 | Koch et al. . |
| 5,368,520 | 11/1994 | Koch et al. .............................. 452/165 |
| 5,374,214 | 12/1994 | Martin et al. ............................ 452/165 |

FOREIGN PATENT DOCUMENTS

| | | | |
|---|---|---|---|
| 0 168 865 | 6/1986 | European Pat. Off. | ......... A22C 21/00 |
| 0 551 156 | 7/1993 | European Pat. Off. | ......... A22C 21/00 |
| 0 388 331 | 7/1992 | France | ............... A22C 21/00 |
| 0 380 714 | 8/1992 | Germany | ......... A22C 21/00 |
| 0 336 162 | 6/1993 | Germany | ......... A22C 21/00 |
| 42 34 040 | 4/1994 | Germany | ......... A22C 21/00 |

*Primary Examiner*—Willis Little
*Attorney, Agent, or Firm*—John S. Pratt; Kilpatrick Stockton LLP

[57] ABSTRACT

In a method and an apparatus for automatic removal of at least an inner fillet from slaughtered poultry or a part thereof before the connection between the inner fillets and the carcass is broken, a separation is made in the opening bounded by the clavicle and the breastbone, whereupon the inner fillets are at least partly scraped off from the carcass. In another method of filleting, the canalis triosseus is cut open in the shoulder joint, whereupon at least the inner fillets are pulled free from the carcass with the aid of the humerus. Previously, the connection between the membrane of the inner fillets and the breastbone in the region of the coracoideum is broken. For placing a front half of a slaughtered bird on a carrier, a bird is hung by its legs on a suspension element, whereupon the front half and the back half are separated from one another except for a rear connection. The front half is thereupon placed on the carrier and the rear connection is broken.

26 Claims, 7 Drawing Sheets

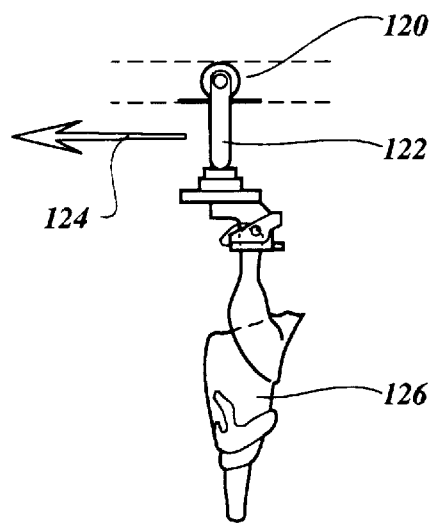
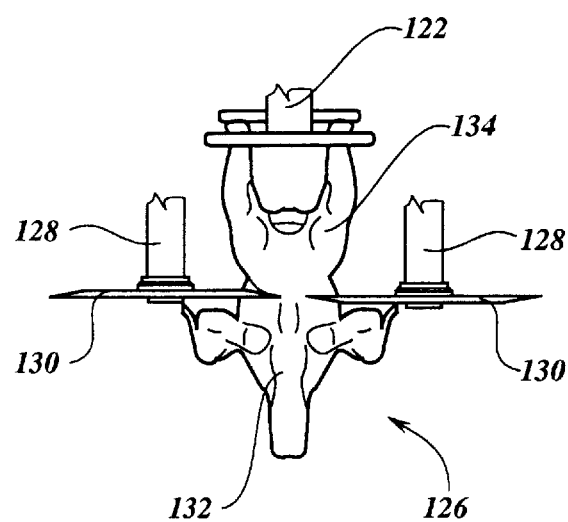
Fig. 9
Fig. 10
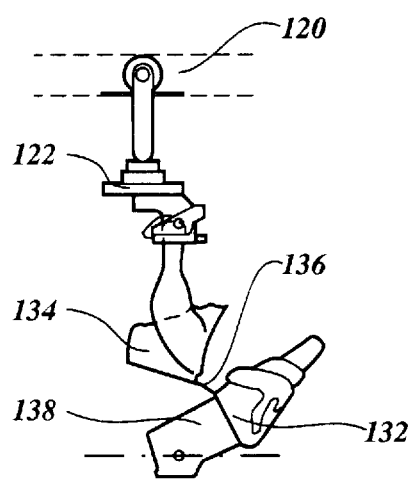
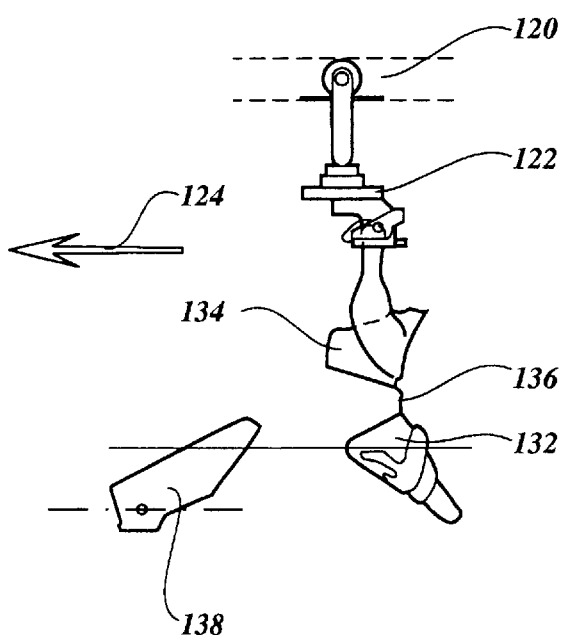
Fig. 11b
Fig. 11a

METHOD AND APPARATUS FOR FILLETING THE BODY OF SLAUGHTERED POULTRY

BACKGROUND OF THE INVENTION

This invention relates to a method and an apparatus for removing automatically at least the inner fillets from slaughtered poultry or a part thereof. The inner fillets, also called tenderloins or tenders, are a part of the bird particularly valued by consumers and therefore valuable, provided that they are of good quality. The inner fillets usually remain behind on the carcass when the outer fillets, also referred to simply as breast fillets, are removed from the carcass.

DISCUSSION OF THE PRIOR ART

In the prior art various methods and apparatuses are known for the removal of, in particular, the inner fillets from the carcass of a bird.

U.S. Pat. No. 4,477,942 discloses how, after the outer fillets have first been peeled off mechanically, the inner fillets are first cut free in the vicinity of the shoulder joints, whereupon the inner fillets are pulled off the carcass by hand.

In U.S. Pat. No. 4,648,155 it is disclosed how, after the removal of the wings and the outer fillets, the inner fillets are removed from the rib cage by first cutting the inner fillets free mechanically and pushing them away from the ribs with the aid of a pair of obliquely extending knives cutting on each side of the breastbone, and then scraping the inner fillets from the carcass with the aid of a pair of scrapers. The scrapers are provided with rubber inserts whose edges apply the scraping action. The inner fillets scraped loose are received in a receptacle.

U.S. Pat. No. 4,827,570 discloses that, after the removal of the outer fillets, the inner fillets are removed mechanically by first cutting into the connections between the clavicle, the carcass and the inner fillets at a point along the clavicle by means of knives. The inner fillets are thereupon further freed from the clavicle by means of two successive sets of peeling fingers, whereupon the inner fillets are ploughed entirely free from the carcass, starting from the shoulder joint of the carcass, in the direction of the belly side of the latter, with the aid of scraping elements.

U.S. Pat. No. 4,937,918 discloses how the membranes securing the inner fillets to the carcass are mechanically removed from the carcass by cutting through them with the aid of rotating knives after the removal of the outer fillets. The inner fillets are then partly ploughed loose from the carcass with the aid of discs, and finally the inner fillets are removed by hand from the carcass.

U.S. Pat. No. 5,314,374 discloses the removal of inner fillets from a poultry carcass conveyed on a carrier, by first cutting and plowing the inner fillets almost completely free from the carcass, and next gripping the inner fillets with a pair of jaws pulling the inner fillets free from the carcass transversely to the direction of conveyance.

In European Patent Application No. 168,865 the starting point is a different method: before the removal of the breast meat, that is to say the outer fillets and the inner fillets, a part of the clavicle is removed. Use is made of scraping elements in the removal of the breast meat.

A difficulty in the methods and apparatuses of the prior art is that the mechanical scraping process indicated therein compresses the inner fillets to a greater or lesser extent in the longitudinal direction, whereby the flesh structure of the inner fillets is damaged. This has the consequence that the appearance of the inner fillets obtained in this manner is less attractive to the consumer and that they go off more quickly.

Another difficulty in the prior art is that the membrane of the inner fillets is damaged or is left on the carcass, so that in the place where the membrane adheres to the inner fillets in the natural state a frayed meat surface structure is formed, which impairs the quality of the meat in the same way as is described above.

With the usual methods, a small part of the meat of the inner fillets near the clavicle remains on the carcass after the removal of the inner fillets, because the latter must be cut free from the breastbone with due regard to a safe distance from the clavicle. If this distance is too short there is in fact a great risk that the clavicle will come into contact with a cutting or scraping element and that splinters of bone or particles of the clavicle will remain in the inner fillets. This cannot be tolerated from the point of view of product quality and liability for the product. The consequence of all this is that after the removal of the inner fillets not inconsiderable amounts of meat remain on the carcass.

As an additional difficulty it should also be stated that in the methods of the prior art the inner fillets are frequently detached from the carcass in such a manner that considerable damage is done to the structure of the meat surface in the area where the separation is made.

The object of the invention is to provide a method and an apparatus by means of which inner fillets can be removed mechanically and automatically from the carcass of a bird, while the greatest possible amount of meat is obtained and damage to the meat is prevented as much as possible.

This object is attained according to the invention by a method wherein prior to scraping off the inner filet the membrana sternocoracoclavicularis is released by making a separation in the opening defined by the natural position of the clavicle and the breastbone. The making of a separation in this position has the consequence that absolutely no residues of meat remain behind on the carcass after the removal of the inner fillets.

Before the inner fillet is scraped away from the body of the poultry the connection between the membrane of the inner fillet and the breastbone in the region of the coracoideum is preferably broken. With freshly slaughtered products this process can be carried out either before or after the breaking of the connection between the inner fillet and the clavicle in the manner described above. If the product is matured and therefore more vulnerable, it is preferred to carry out this process after the breaking of the connection between the inner fillet and the clavicle.

In order to leave the membrane of the inner fillet as far as possible intact, the inner fillet is only partly scraped away from the body of the poultry, after which the part already scraped away is gripped and the inner fillet is pulled free from the body of the poultry substantially in front of the breast thereof. By leaving the membrane intact, the surface structure of the meat under it is kept intact, so that the inner fillet has an attractive appearance and will keep for a long time.

According to the invention an apparatus for the automatic removal of at least an inner fillet from slaughtered poultry or a part thereof comprises a carrier for fixing thereon the poultry or a part thereof, at least comprising the breast with the inner fillets attached, separating elements for the inner fillets, which elements are adapted to be inserted, on opposite sides of the breastbone, into the openings defined by the natural position of the clavicle and the breastbone for the purpose of releasing the membrana sternocoracoclavicularis, and scraping means for scraping off the inner fillets from the body of the poultry. The carrier usually forms part of a conveyor. It may for example have the configuration described in European Patent Application No. 551,156. In such a case the scraping means and the separating elements may be arranged—if necessary movably—along the path of the conveyor. It is naturally also possible to install the carrier in a fixed position and to make the scraping means and separating elements movable.

In a preferred embodiment the apparatus according to the invention comprises membrane separation means for breaking the connection between the membrane of the inner fillets and the breastbone in the region of the coracoideum. The membrane thus continues to cover the outer surface of the inner fillets even after they have been removed from the body of the poultry, which is advantageous for their appearance and for the keeping properties of the inner fillets.

In another preferred embodiment the apparatus according to the invention comprises inner fillet removal means for gripping the inner fillet and pulling it free from the body of the poultry substantially in front of the breast thereof.

The separating elements for a set of inner fillets expediently consist of two substantially parallel plates facing one another and having a free end, the plates being mounted resiliently in relation to one another and in relation to a holder, said holder being movable in a controlled manner relative to the carrier. The ends of the plates have dimensions such that they can without difficulty pass through the openings bounded by the clavicle (if present) and the breastbone, in order to be able to follow the contour of the breastbone as closely as possible, the distance between the plates is shorter than the maximum width of the breastbone. In addition, the resilient connections between the holder and the plates ensure that the plates can easily and accurately follow the contours of the breastbone. The edges of the free ends of the plates are blunt, optionally with the exception of the front side, which may be sharp, thus preventing splinters of bone from being cut off from the breastbone or the clavicle and passing into the inner fillets.

In an advantageous embodiment the membrane separation means for a set of inner fillets comprise two rotatable discs extending generally in one and the same plane. By moving the discs along the rib cage of the bird, on the underside of the inner fillets, the inner fillets are propelled upwards and the connection between the membrane of the inner fillets and the breastbone in the region of the coracoideum can thus be broken. A good propelling action of the discs is obtained by providing their circumferential edge with a frustonical shape. The circumferential edge of the discs is preferably provided with at least one radially projecting knife for an additional controlled separation of the inner fillet membrane from the breastbone.

In a preferred embodiment the scraping means for a set of inner fillets consist of two scraper plates mounted resiliently at an angle to one another and to a holder, the holder being movable in a controllable manner relative to the carrier, while the scraper plates are adapted to be placed on opposite sides of the clavicle and then on the latter and to be moved along the breastbone away from the clavicle. The distance between the scraper plates is preferably shorter than the maximum width of the breastbone. By means of the above-described measures a scraping action is obtained which extends over the entire surface over which the inner fillet cover the rib cage.

In an expedient and simple embodiment the carriers form part of a conveyor along whose path the separating elements, the membrane separation means and the scraping means are installed.

Another method according to the invention for automatic removal of at least an inner fillet from slaughtered poultry or a part thereof, the poultry or part thereof comprising at least a part of the humerus appertaining to said inner fillet, comprises the steps of making an incision in a shoulder joint of the poultry, covering the processus acrocoracoideus in order to open the canalis triosseus, the connection between the inner fillet and the appertaining humerus remaining generally intact; and separating the inner fillet from the poultry by acting on the humerus. By thus opening the canalis triosseus the tendon connection, enclosed therein, between the humerus and the appertaining inner fillet can leave the canalis triosseus when the humerus, or the wing of which the humerus forms part, is used to pull off the inner fillet from the body of the bird. Because the processus acrocoracoideus is cut through, it is possible for the first time for an outer fillet to be torn away from the body, simultaneously with the inner fillet lying under it, by means of its tendon connections to the humerus, with the aid of the humerus or the wing. It may here be observed that, in order to obtain the largest possible amount of meat, an incision can also be made in the shoulder, along the shoulder blade, before the fillets are pulled free from the body. However, this shoulder cut is already generally known for the purpose of pulling only the outer fillets off the bird with the aid of the humerus or of the wing.

Cutting through the processus acrocoracoideus in the shoulder joint is greatly facilitated and its reliability is greatly increased if, before the incision in the shoulder joint is made, a force is exerted on the humerus to position the tendon connecting the humerus to the inner fillet in the canalis triosseus on the side of the latter which is directed towards the breastbone. By the last-mentioned measure the caput humeri of the humerus is brought away from the shoulder joint, so that a cutting element can in a simple manner cut through the processus acrocoracoideus as is desired. The risk that the tendon connection between the humerus and the inner fillets will be touched by the cutting element is greatly reduced by this measure.

A very reliable way of moving the humerus in the desired direction is achieved if the caput humeri is pressed in the direction of the ribs in relation to the scapula and the coracoideum.

Preferably, before an incision is made in the shoulder joint, the shoulder joint is accurately positioned, relative to a cutting element, against a stop which acts on the shoulder joint on the side facing away from the humerus.

In order to prevent damage to the inner fillets while they are being scraped free in the vicinity of the lamella of the clavicle and the breastbone point, the clavicle is removed before the filleting. In the prior art various apparatuses are known for this purpose. When the clavicle has been removed, it cannot be accidentally touched in the cutting-through of the processus acrocoracoideus.

According to the invention an apparatus for automatic removal of at least an inner fillet from slaughtered poultry or a part thereof comprises a carrier for fixing thereon the poultry or a part thereof, at least comprising the breast with at least a part of the wings and with the inner fillets attached; and shoulder joint positioning means for positioning a shoulder joint in relation to a cutting element for cutting through the processus acrocoracoideus of the shoulder joint.

In a preferred embodiment the carrier forms part of a conveyor, and the carrier is composed of an elongated conical support element which is arranged to move the poultry or part thereof with the breast or the rear side thereof in the conveying direction of the conveyor, the cutting element preferably being installed along the path of the carrier, and the shoulder joint positioning means comprising a guide which extends substantially parallel to the path of the carrier and is adapted to make contact with the shoulder joint on the side facing away from the humerus, while the cutting means are arranged for cutting from the humerus side.

In another preferred embodiment the apparatus has humerus positioning means for displacing the humerus in the direction of the ribs of the poultry in relation to the remainder of the shoulder joint, which humerus positioning means may comprise a guide which extends substantially parallel to the path of the carrier and is adapted to make contact with the caput humeri and to displace the latter in the downward direction. In this embodiment the cutting element can in a simple manner act substantially transversely to the path of the carrier and in the horizontal direction.

To prepare for a filleting process, according to the invention the skin of slaughtered poultry or a part thereof, at least comprising the breast with at least a part of the wings, is accurately and reliably removed by cutting through the skin at least almost completely between the upper side of the shoulder joint and the wing axilla, next the skin is removed from the lateral side of the poultry body, and next the skin is removed from the breast of the poultry. An apparatus for this purpose according to the invention comprises a carrier for fixing thereon the poultry or part thereof, at least comprising the breast with at least a part of the wings, said carrier forming part of a conveyor and being able to be brought into a first position in which the breast side of the bird is directed transversely to the conveying direction of the conveyor, and being able to be brought into a second position in which the breast side or the rear side of the bird is directed in the conveying direction, while in succession the carrier in its first position passes cutting means installed along the path of the carrier for the purpose of making an incision in the skin between the upper side of the shoulder joint and the wing axilla; in its second position passes a set of rotatable helically ribbed skin removal rollers installed parallel to the path of the carrier for the removal under the wing of the skin of the lateral side of the body of the poultry, and in its first position passes a set of rotatable helically ribbed skin removal rollers installed parallel to the path of the carrier for the removal near the breastbone of the skin of the breast of the poultry.

To prepare for a filleting process, the front half of a slaughtered bird is in accordance with the invention placed on a carrier by successively hanging a slaughtered, eviscerated bird by its legs on a suspension element, separating a front half, comprising the breast, from a back half, comprising the hips and the legs, except for a connection on the rear side of the bird between the front half and the back half, whereupon the front half is mounted on the carrier and said connection is broken. By retaining at first a connection between the front half and the back half on the rear side of the bird, the front half comes to hang with the breast side directed downwards under the back half. In the opening at the belly side which is produced in the front half by the separation of the back half from the front half, a generally cone-shaped carrier can easily be fitted automatically, and is able to carry it along after the remaining connection between the back half and the front half has been broken.

For preference the front half is conveyed along a first path and the carrier is conveyed along a second path, the front half and the carrier moving next to one another at substantially the same speed, with the breast side of the front half facing the carrier, and the first path and the second path converging at least until the front half is mounted on the carrier. Another advantageous way of fitting a carrier in the front half is by conveying the front half along a first path with the breast in the conveying direction, and conveying the carrier along a second path, the front half and the carrier moving towards one another along the first and second paths respectively, at least until the front half is situated on the carrier. There is thus great freedom in the conveying of slaughtered birds, with the front half cut free from the back half with the exception of the rear connection, and in the conveying of the separated front halves on carriers. The first and second paths should come together only in the region in which the front half is brought onto the carrier.

According to the invention the apparatus for mounting a front half of a slaughtered bird on a carrier is designed such that the carrier forms part of a first conveyor and is composed of an elongated conical support element which is arranged so that its end is directed at an angle to the vertical towards the separation surface of the front half. The suspension element preferably forms part of a second conveyor.

In a first preferred embodiment, the conveying directions of the first and the second conveyor are generally the same, the paths or the first and the second conveyor converging towards another.

In another preferred embodiment, the paths of the first and the second conveyor are generally parallel, and the first conveyor is arranged for operation at a lower speed in its conveying direction than that of the second conveyor in the same direction. In a further preferred embodiment, the paths of the first and the second conveyor are generally parallel, and the conveying directions of the first and the second conveyor are opposite. Here, the conical support element or any other suitable carrier picks up the front half because of the difference in speed between the first and second conveyor. This difference in speed ensures that the front half is pulled fast on the carrier, whereupon the front half is further fixed if desired and the back connection is broken by the forces exerted on its, or is broken in a controlled manner with the aid of a cutting element. The first or the second conveyor can be stationary when a front half is brought onto the carrier, while the other conveyor is in motion.

The claims and advantages will be more readily appreciated as the same becomes between understood by reference to the following detailed description and considered in connection with the accompanying drawings in which like reference symbols designate like parts.

BRIEF DESCRIPTION OF THE DRAWINGS

FIG. 9 shows a side view of a conveyor having a suspension hook on which a slaughtered, drawn bird is hung;

FIG. 10 illustrates a separation process to be carried out to separate the back half from the front half;

FIGS. 11a and 11b illustrate successive stages a first way of bringing a front half onto a carrier;

DESCRIPTION OF THE PREFERRED EMBODIMENTS

Figure 1:
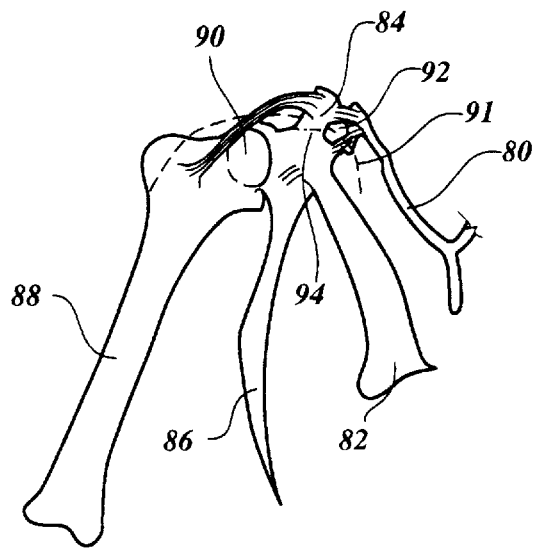
FIG. 1 is a front view of a shoulder joint of a bird, in which only one tendon is shown schematically.

FIG. 1 illustrates the bone connections in the shoulder joint and shows a part of the clavicle (wishbone) 80, the coracoideum (collar bone) 82 with the processus acrocoracoideus 84 at one end, the scapula (shoulder blade) 86 and the humerus (wing bone) 88 with the caput humori 90. The tendon connection between an inner fillet and the humerus 88 is represented by a broken line 91 and passes through the canalis triosseus 92. The canalis triosseus 92 is opened by cutting away the processus acrocoracoideus 84 from the coracoideum 82 along the dot-dash line 94, whereby the tendon connection 91 can come away from the canalis triosseus 92 and the inner fillet can be pulled free from the carcass by acting on the humerus 88.

Figure 2:
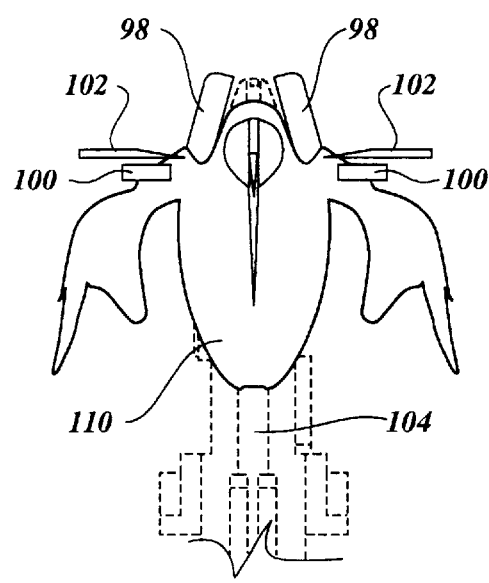
FIGS. 2 and 3 schematically show in front and side views respectively, along a conveyor provided with carriers, a station for making a shoulder incision, a front half on a carrier being shown only in FIG. 2.
Figure 3:
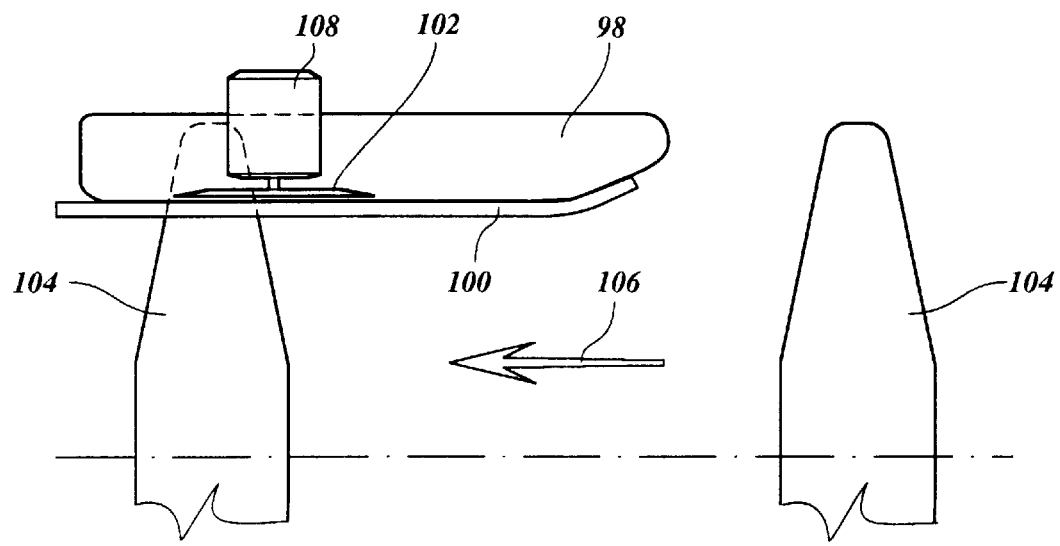

FIGS. 2 and 3 show shoulder joint guides 98, humerus guides 100 and cutting elements 102. The shoulder joint guides 98, the humerus guides 100 and the cutting elements 102 are installed in a frame (not further shown) on both sides of the path of a conveyor by means of which carriers 104 can be moved along in the direction of the arrow 106. The cutting elements 102 are shown as rotating knives driven by a motor 108, but may also consist of fixedly mounted knives.

As illustrated in FIG. 2, on passing through the station the shoulder joints of a front half 110 placed on the carrier 104 are positioned by the shoulder guides 98, which bear against that side of the processus acrocoracoideus 84 which faces away from the humerus 88. The humerus guides 100 ensure that the humerus is pressed downwards, after which the cutting elements 102 make the cut 94 (FIG. 1). In a following processing station the inner fillets, optionally together with the outer fillets, can then be torn free from the carcass by means of (at least a part of) the humerus 88 or the wing. Before or directly after passing through the station shown in FIGS. 2 and 3, the clavicle 80 is optionally removed from the carcass in order to facilitate the tearing-off of the fillets from the carcass and thus to maximize the meat yield.

Another way to effect the filleting is discussed below with reference to FIGS. 4, 4a, 5, 6a, 6b, 7 and 8.

Figures 4, 4A:
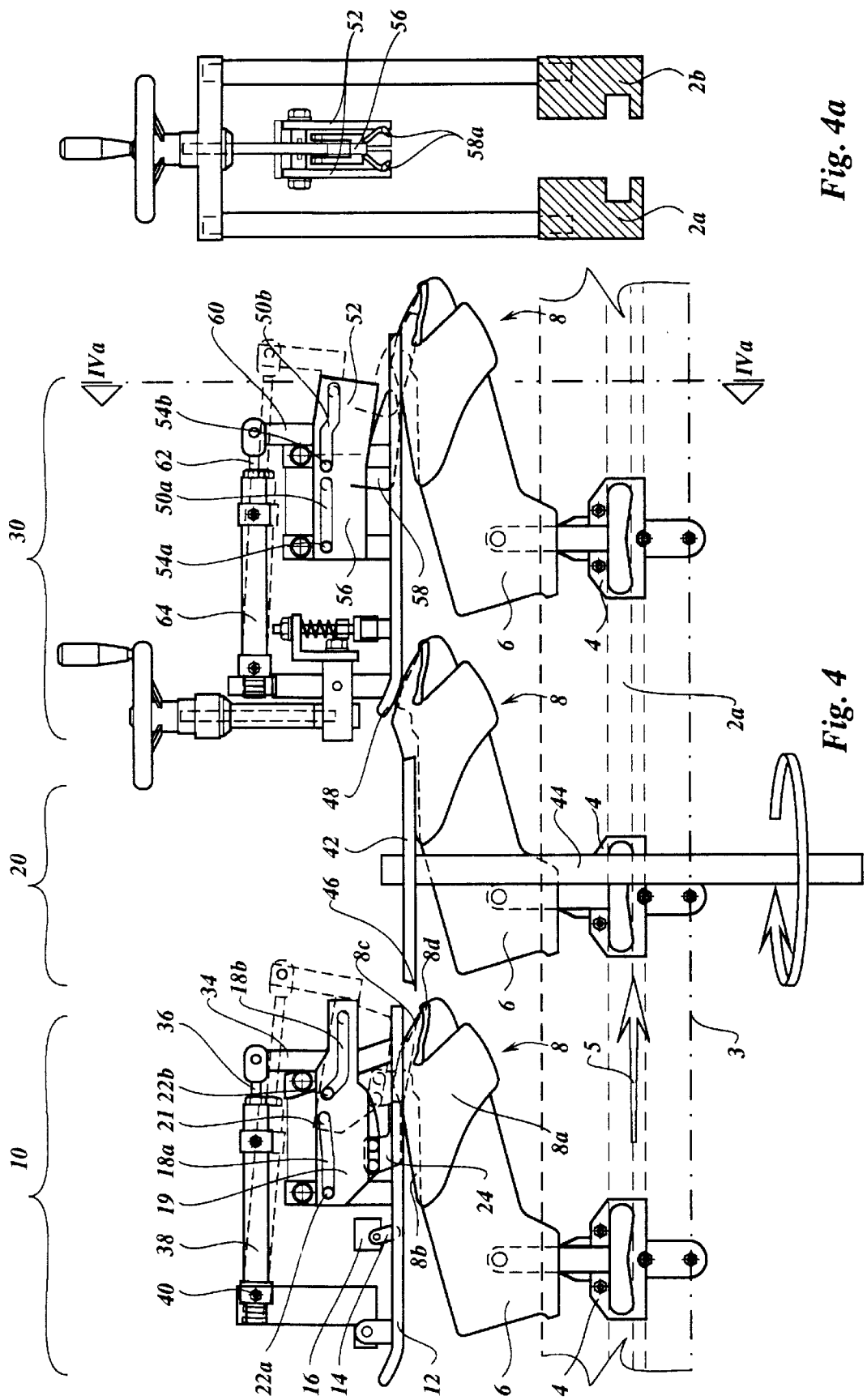
FIG. 4 shows a schematic side view of an embodiment of a filleting station according to the invention.
FIG. 4a schematically shows a cross-section of the apparatus shown in FIG. 4, taken on the line IVa—IVa.

FIGS. 4 and 4a show two mirror-image conveyor rails 2a and 2b, between which are enclosed sliding elements 4 which can move in the longitudinal direction of the conveyor rails 2a, 2b, in the direction indicated by the arrow 5. The sliding elements 4 are mutually coupled by means of a chain 3 or the like, indicated by a dot-dash line. A mounting support 6 is fastened rotatably and tiltably on each of the sliding elements 4. Each mounting support 6, which is described in greater detail in European Patent Application 551,156, has a substantially frustoconical end on which a front half 8 of a bird can be placed and fastened. For the sake of clarity only the rib cage 8a, the breastbone 8b, the clavicle 8c and the coracoideum 8d of each front half 8 are shown schematically in FIG. 4; the inner fillets, which are situated in the transition region between the rib cage 8a and the breastbone 8b are not shown in the figure in order to make it possible to show as clearly as possible the different components or the apparatus and the place where they act on the carcass.

Three processing stations 10, 20 and 30 respectively are installed along the path of the mounting supports 6. For the sake of clarity of the drawing the processing stations 10, 20 and 30 are as far as possible shown without support elements which effect the fixing of the processing station in relation to a frame in which the conveyor rails 2a and 2b are also held.

The processing station 10 is situated centrally above the conveyor rails 2a and 2b and comprises two guide strips 12, of which only one is visible in FIG. 4 and which between them leave open a slit of a width such that the upwardly projecting breast point of a front half 8 located on a mounting support 6 is guided therebetween. In the slit between the guide strips 12 is likewise situated an end of a pivotally mounted lever 14 which operates a switch 16 when the breast point of a front half 8 pushes the lever 14 out of the position shown in FIG. 4. The switch 16 thus gives a signal for the operation of the processing station 10, to which detailed reference will be made again further on. Above each guide strip 12 is situated a plate 19 provided with guide slots 18a and 18b. Between the plates 19 is enclosed a holder 21, which is shown in greater detail in FIG. 6a. The holder 21 is provided with pins 22a and 22b, which are guided in the slots 18a and 18b respectively. Outside the region of the plates 19, separating elements 24 are fastened resiliently on the holder 21. The separating elements 24 are each provided with two holes, which correspond with holes provided in the holder 21. Through the holes are pushed pins which are provided at each end of a plug 26 in order to enclose springs 28 between the plugs 26 and the separating elements 24, so that the latter can yield laterally. The edges of the separating elements 24 are usually made entirely blunt, but their front ends 24a may be provided with a cutting edge. The holder 21 is provided with a lip 32 or the like, to which an angle member 34 can be fastened. The end of the angle member 34 remote from the holder 21 is pivotally connected to the end of a piston rod 36 of a double-acting pneumatic cylinder and piston unit 38. At the end remote from the angle member 34 the cylinder and piston unit 38 is connected to the frame of the apparatus for pivoting about an axis 40.

The processing station 20 comprises two discs 42, which are installed one on each side of the path of the mounting supports 6, only one being visible in FIG. 4, and which are located at a distance from each other such that the breastbone 8b of a front half 8 mounted on a mounting support 6 can pass therebetween in the direction of the arrow 5. The discs 42 are mounted on axes 44, each of which during operation is driven in such a manner that the circumferential region of the discs 42 moves, near a front half 8 passing between them, in the direction of the arrow 5. The side of the discs 42 is frustonical and stands at an angle of about 10° to the longitudinal direction of the axes 44. At one place on the circumference a radially projecting cutting element 46 is arranged on the bottom edge of each disc. The rotation of the discs 42 is synchronized with the movement of the mounting support 6 in the direction of the arrow 5.

Figure 8:
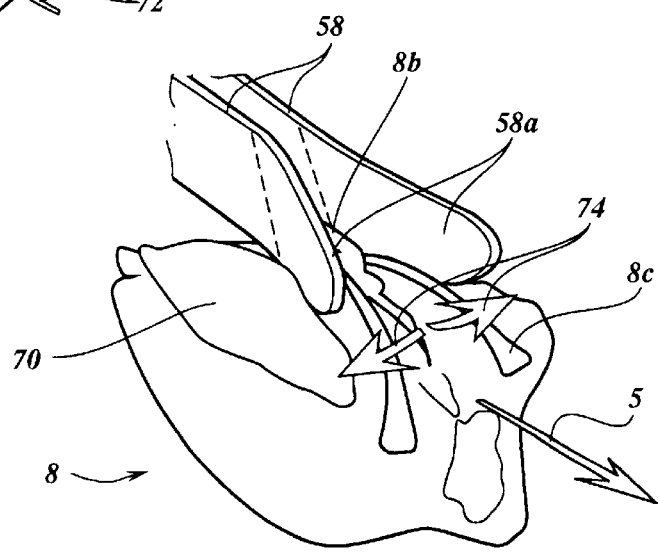
FIG. 8 shows a schematic view in perspective of the carcass part shown in FIG. 6b, to illustrate a third process carried out thereon.

The processing station 30 has guide strips 48 similarly to the processing station 10. Above the guide strips are installed guide walls 52 which are provided with guide slots 50a and 50b and between which, similarly to the processing station 10, a plate-shaped holder 56 provided with pins 54a and 54b is mounted so as to be slidable. Two scraping elements 58, of which the scraping front side is illustrated in greater detail in FIG. 8, are resiliently fastened to the holder 56. As shown in FIG. 8, the scrapers 58, which can be made of metal or plastics material, are installed at a short distance from each other and are provided on the front side with ends 58a bent sideways. The holder 52 is pivotally connected by means of an angle member 60 to the end of a piston rod 62 of a double-acting pneumatic cylinder and piston unit 64. At the end remote from the angle member 60 the cylinder and piston unit 64 is pivotally connected to the frame of the apparatus.

The action of the apparatus will be explained with the aid of FIGS. 4, 6a, 6b, 7 and 8. In the first place, as shown in FIG. 4, a front half 8 fixed on a mounting support 6 is passed through the first processing station 10. Through the operation of the lever 14 by the breastbone 8b, the switch 16 signals the presence of a front half 8 on the mounting support 6, and delivers a signal to the control system of the apparatus so that, taking into account the speed of movement of the mounting support 6 in the direction of the arrow 5, after a predetermined delay time, the cylinder and piston unit 38 is energized. This energization takes place when the upwardly projecting point of the breastbone 8b of the front half 8 has passed the front side 24a of the separating elements 24. The holder 21 of the separating elements 24 is moved in the direction of the arrow 5 and slightly tilted downwards by means of the guide slots 18a when the piston rod 36 is pushed out of the cylinder and piston unit 38, the end position reached being shown in dashed lines in FIG. 4. The resulting movement of the separating elements 24 takes place very much more quickly than the movement of the mounting supports 6. The front sides 24a of the separating elements 24 thus move downwards along the breastbone and forwards into the openings bounded by the breastbone 8b and the clavicle 8c, releasing the membrana sternocoracoclavicularis. This is elucidated in FIG. 6b, in which arrows 68 illustrate the direction of the movement of the front sides 24a of the separating elements 24. Inner fillets 70 are thus cut free from the breastbone under the clavicle 8c. The separating elements 24 are then pulled back into the starting position shown in FIG. 4. It is to be remarked here that the clavicle may have been removed earlier from the front half, in which case the term clavicle in the above is merely used to define the natural position of the clavicle.

The front half, with the inner fillets 70 freed from the breastbone 8b under the clavicle 8c, then passes through the second processing station 20. The frustonical side of the rotating discs 42 engages the sides of the inner fillets 70 and pushes them upwards, as illustrated by the arrows 72 in FIG. 7. In this action the cutting element 46 ensures that the membrane of the inner fillets 70 on the underside of the latter is cut free from the breastbone over some distance.

The preprocessed front half then passes through the third processing station 30, in which the guide strips 48 bring downwards again the inner fillets 70 pushed upward in the second processing station 20. After the upwardly projecting point of the breastbone 8b of a front half 8 has passed the ends 58a of the scraping elements 58 in the third processing station 30, the cylinder and piston unit 64 is energized. The moving piston rod 62 drives the holder 56 and the scraping elements 58 connected thereto in a movement, determined by the guide slots 50a and 50b, in the direction of the arrow 5, while the holder and the scraping elements 58 tilt slightly downwards. The end position reached is shown in dashed lines in FIG. 4. The movement of the scraping elements 58 takes place very much more quickly than the movement of the mounting supports 6. In the operative position the ends 58a of the scraping elements 58 come to lie one on each side of the clavicle 8c, as illustrated in FIG. 8, so that a movement of the front half 8 on the mounting support 6 in the direction of the arrow 5 results in a scraping force, exerted substantially in the direction of the arrow 74, on the inner fillets 70 on each side of the breastbone 8b.

Figure 5:
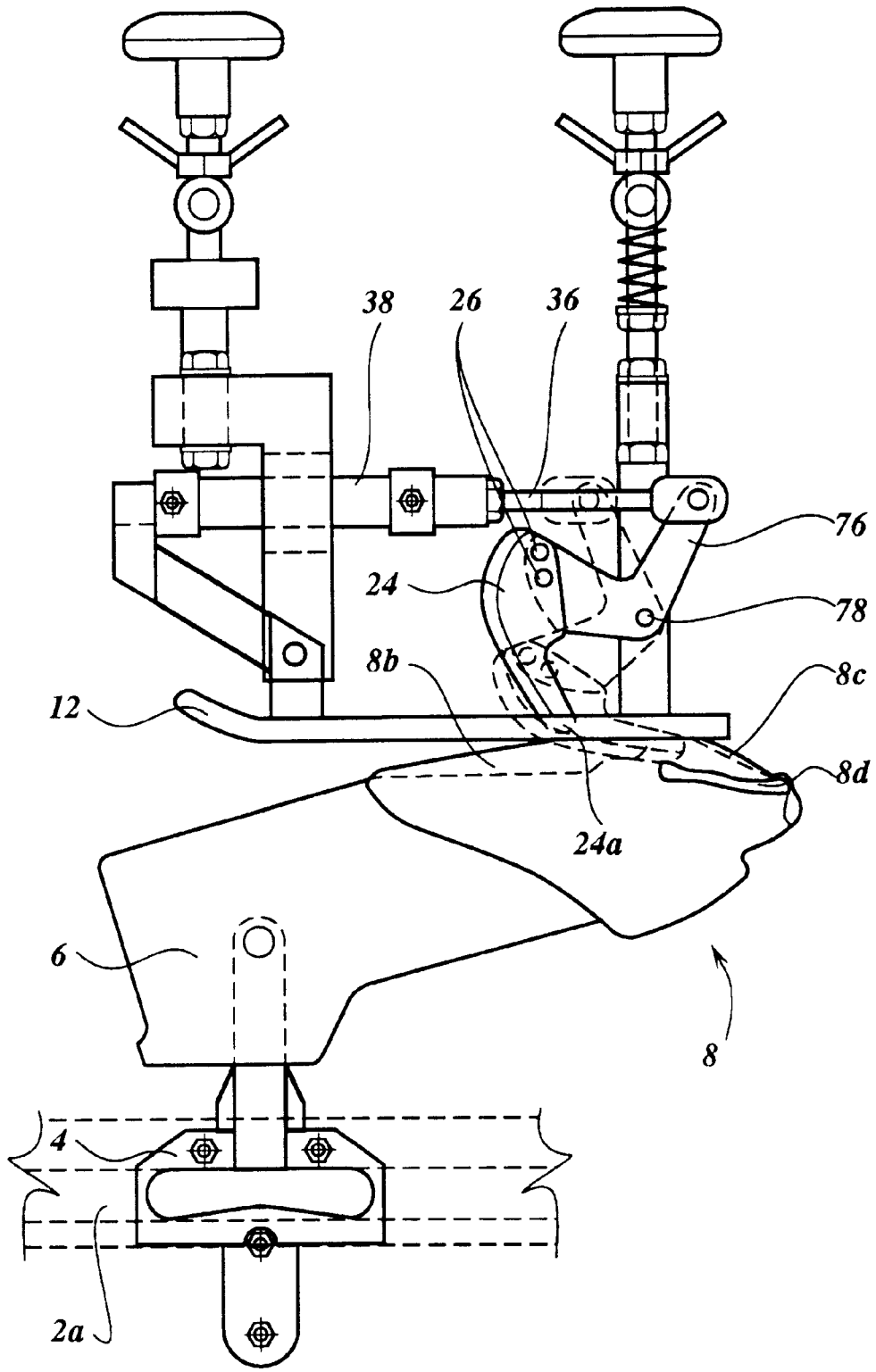
FIG. 5 shows a schematic side view of an alternative embodiment of a station of the apparatus according to FIG. 4.
Figure 6A:
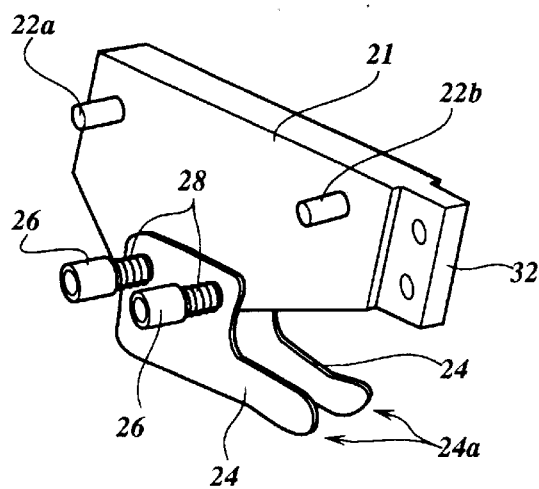
FIG. 6a shows in perspective a schematic view of a component of the apparatus shown in FIG. 4.
Figure 6B:
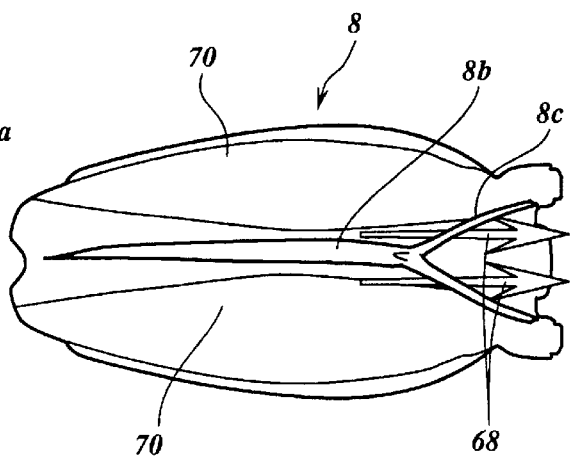
FIG. 6b is a schematic front view of a part of the carcass of a bird having inner fillets, to illustrate a first process.
Figure 7:
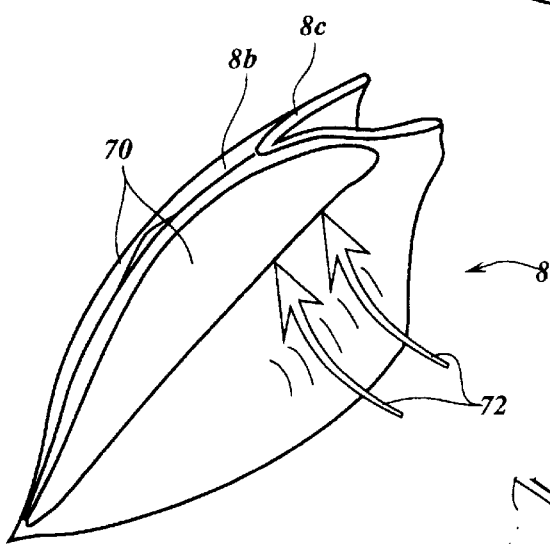
FIG. 7 is a schematic view in perspective of the carcass part shown in FIG. 6b, to illustrate a second process.

FIG. 5 illustrates an alternative embodiment of a first processing station, in which a separation is made between the breastbone 8b and the inner fillets under the clavicle 8c. In a similar manner to that described with reference to FIG. 6a, separating means 24 are resiliently mounted on a lever 76 which is pivotable about a fulcrum 78. The end of the lever 76 remote from the separating elements 24 is pivotally connected to the end of the piston rod 36 of the cylinder and piston unit 38. When the piston rod 36 moves to the left in the drawing on the energization of the cylinder and piston unit 38, the lever 76 pivots in the counterclockwise direction and the front ends 24a of the separating elements 24 move along the breastbone 8b and under the clavicle 8c.

FIG. 9 shows a part of a rail 120 of substantially inverted T-shaped cross-section, along which suspension elements 122 are moved in the direction of the arrow 124. Further details of the suspension element 122 are not discussed here, since the are not relevant to the understanding of the present invention. The suspension element 122 carries a slaughtered, eviscerated bird 126, the breast side of which is turned in the conveying direction 124.

As illustrated in FIG. 10, in the separation of the carcass into a front half and a back half the bird 126 passes two substantially circular knives 130 which are rotatably mounted on axes 128 and which are arranged substantially in one plane at a predetermined distance from one another. The carcass is thus not completely cut through; connections remain intact under the breastbone and on the rear side between the front half 132 and the back half 134.

As shown in FIG. 11a, any skin connection under the breastbone gives way immediately because of the weight of the front half 132, whereas on the rear side of the carcass a connection 136 remains intact and is strong enough to carry the front half 132. A carrier 138, a conical end of which is directed towards the front half 132, is now brought into the path of the front half 132, and the carrier and the front half are moved towards one another, either by moving carrier 138 in the same direction 124 as the suspension element 122, but slower, or by moving carrier 138 in the opposite direction to direction 124. As illustrated in FIG. 11b, the front half 132 is so to speak "caught" on the carrier 138 and pulled fast on its. In this way the front half 132 comes completely automatically onto the carrier 138 and, after the connection 136 has been broken, said carrier can convey the front half 132 independently of the rear half to the previously described processing stations for the filleting of the front half 132.

Figure 12:
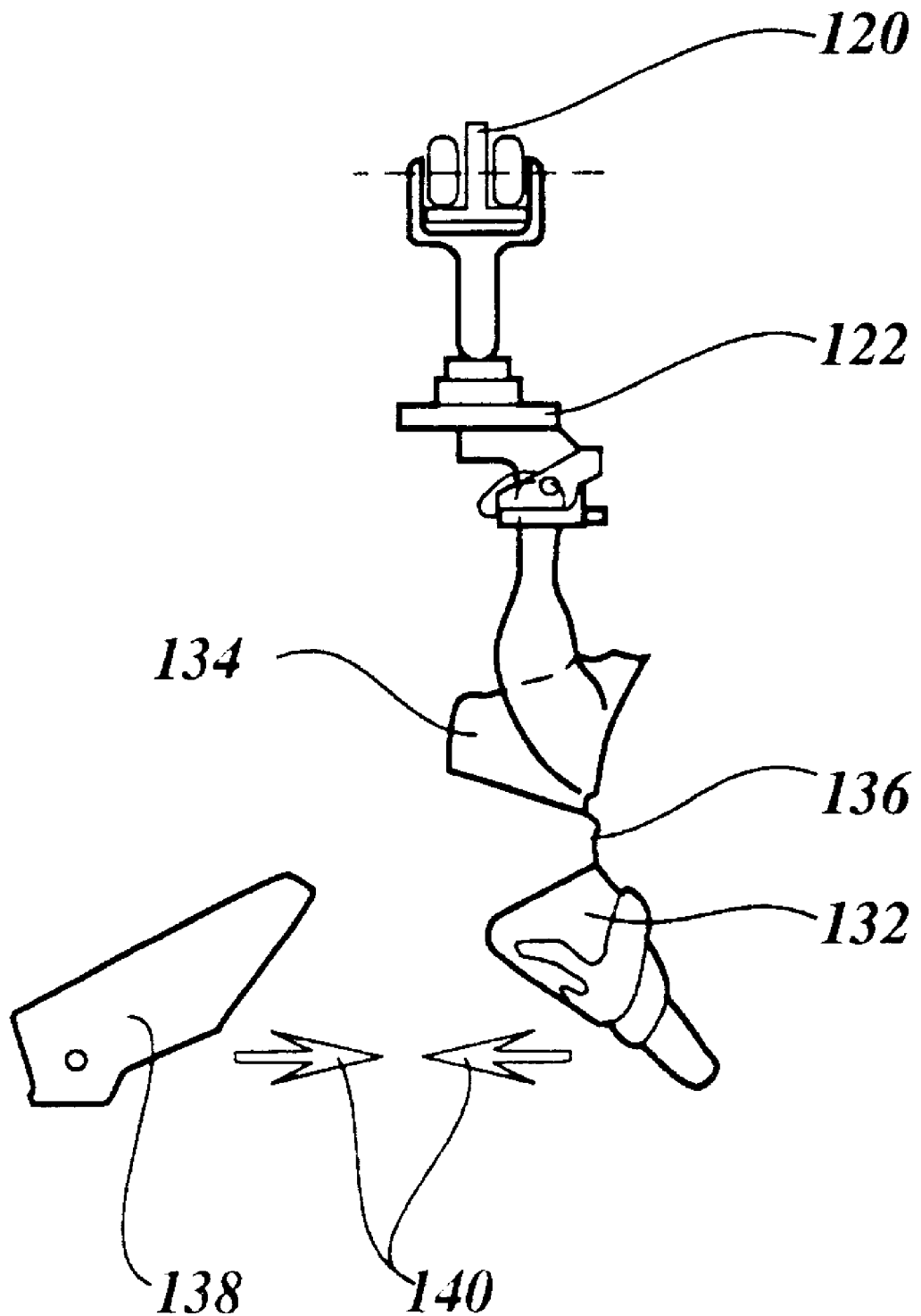
FIG. 12 illustrates a second way of bringing a front half on a carrier.

As illustrated in FIG. 12, it is also possible to move the front half 132 and the carrier 138 side by side generally in the same direction at right angles to the plane of the drawing, bringing the front half 132 on the carrier 138 at a converging part of their paths, indicated by arrows 140.

Figure 13A:
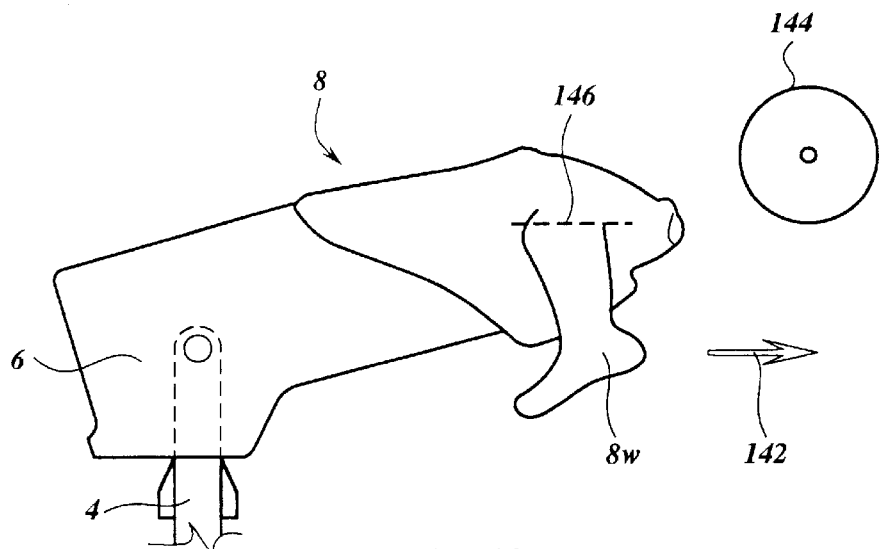
FIGS. 13a, 13b and 13c illustrate successive stages of removing the skin from a front half mounted on a carrier.
Figure 13B:
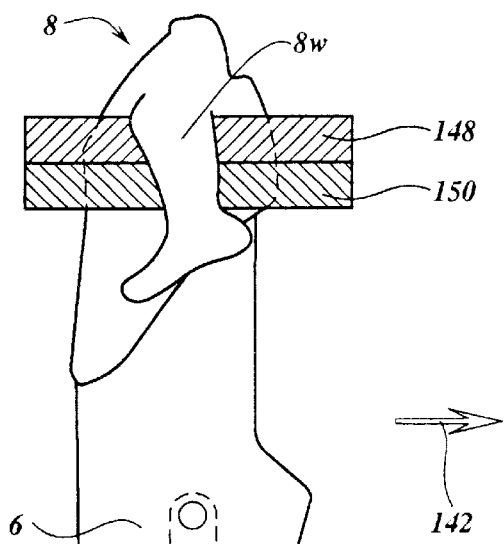
Figure 13C:
Figure 13C:
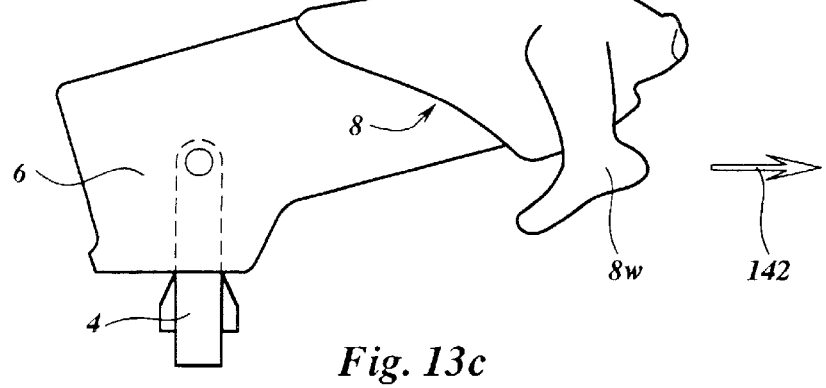

FIG. 13a shows a front half 8 comprising wings 8w and skin and being mounted on the carrier 6 rotatably and tiltably mounted on the sliding element 4 moving in the direction of arrow 142. In the path of the carrier 6 with the front half 8 rotating knifes 144 are arranged such that an incision 146 indicated with a dashed line is made in the skin between the upper side of each shoulder joint and each wing axilla. Following this, as illustrated in FIG. 13b, the carrier 6 is tilted into an upright position and brought in contact with rotating pairs of helically ribbed skin removal rollers 148, 150 (of which only one pair is visible in the drawing) for removing skin under the wings of the front half. To complete the fillet skin removal, as illustrated in FIG. 13c, the carrier 6 is tilted back into the position of FIG. 13a and brought in contact with a rotating pair of helically ribbed rollers 152 (of which only one is visible in the drawing) for removing the skin on the breast side of the front half.

While the invention has been described and illustrated in its preferred embodiments, it should be understood that departures may be made therefrom within the scope of the invention, which is not limited to the details disclosed herein.

What is claimed is:

1. A method for automatic removal of at least an inner fillet from slaughtered poultry or a part thereof, comprising the steps of:

a. making a separation in the opening by the natural position of the clavicle and the breastbone of the poultry to release the membrana sternocoracoclavicularis; and b. scraping off the inner fillet.

2. A method according to claim 1, wherein, before the inner fillet is scraped off, the connection between the inner fillet membrane and the breastbone in the region of the coracoideum is broken.

3. A method according to claim 1, wherein the inner fillet is only partly scraped off, whereupon the part already scraped off is gripped and the inner fillet is pulled free from the poultry substantially in front of the breast thereof.

4. A method according to claim 1, wherein the clavicle is removed before the filleting.

5. A method for automatic removal of at least an inner fillet from slaughtered poultry or a part thereof, the poultry or part thereof comprising at least a part of the humerus appertaining to said inner fillet, the method comprising the steps of:

a. making an incision in the shoulder joint of the poultry, severing the processus acrocoracoideus in order to open the canalis triosseus, the connection between the inner fillet and the appertaining humerus remaining generally intact; and b. separating the inner fillet from the poultry by exerting a force on the humerus.

6. A method according to claim 5, wherein, before the incision is made in the shoulder joint a force is exerted on the humerus to position the tendon connecting the humerus to the inner fillet in the canalis triosseus on the side of the latter which is directed towards the breastbone.

7. A method according to claim 6, wherein the caput humeri is pressed in the direction of the ribs in relation to the scapula and the coracoideum.

8. A method according to claim 5, wherein, before the incision is made in the shoulder joint, the shoulder joint is positioned, relative to a cutting element, against a stop which acts on the shoulder joint on the side facing away from the humerus.

9. A method according to claim 5, wherein the clavicle is removed before the filleting.

10. An apparatus for automatic removal of at least an inner fillet from slaughtered poultry or a part thereof, comprising:

a carrier for fixing thereon the poultry or a part thereof, at least comprising the breast with the inner fillets attached;

separating elements for the inner fillets, which elements are adapted to be inserted, on opposite sides of the breastbone, into the openings defined by the natural position of the clavicle and the breastbone for the purpose of releasing the membrana sternocoracoclavicularis; and scraping means for scraping off the inner fillets from the poultry.

11. An apparatus according to claim 10, comprising membrane separation means for breaking the connection between the membrane of the inner fillets and the breastbone in the region of the coracoideum.

12. An apparatus according to claim 10, comprising inner fillet removal means for gripping the inner fillet and pulling it free from the poultry substantially in front of the breast thereof.

13. An apparatus according to claim 10, wherein the separating elements for the inner fillets consist of two substantially parallel plates facing one another and having a free end, the plates being mounted resiliently in relation to one another and in relation to a holder, said holder being controllably movable relative to the carrier.

14. An apparatus according to claim 13, wherein the free ends of the plates are provided with blunt edges.

15. An apparatus according to claim 13, wherein the distance between the plates is shorter than the maximum width of the breastbone.

16. An apparatus according to claim 10, wherein the scraping means for the inner fillets consist of two scraper plates mounted resiliently at an angle to one another and to a holder, the holder being movable in a controllable manner relative to the carrier, while the scraper plates are adapted to be placed on opposite sides of the clavicle and then on the latter and to be moved along the breastbone away from the clavicle.

17. An apparatus according to claim 16, wherein the distance between the scraper plates is shorter than the maximum width of the breastbone.

18. An apparatus for automatic removal of at least an inner fillet from slaughtered poultry or a part thereof, comprising:

a. a carrier for fixing thereon the poultry or a part thereof, at least comprising the breast with the inner fillets attached;

b. separating elements for the inner fillets, which elements are adapted to be inserted, on opposite sides of breastbone, into the openings defined by the natural position of the clavicle and the breastbone for the purpose of releasing the membrana sternocoracoclavicularis;

c. membrane separation means for breaking the connection between the membrane of the inner fillets and the breastbone in the region of the coracoideum, the membrane separation means for the inner fillets comprises two rotatable discs extending generally in one and the same plane; and d. scraping means for scraping off the inner fillets from the poultry.

19. An apparatus according to claim 18, wherein the circumferential edge of the discs is frustoconical.

20. An apparatus according to claim 18, wherein the circumferential edge of the discs is provided with at least one radially projecting knife.

21. An apparatus for automatic removal of at least an inner fillet from slaughtered poultry or a part thereof, comprising:
   a. separating elements for the inner fillets, which elements are adapted to be inserted, on opposite sides of breastbone, into the openings defined by the natural position of the clavicle and the breastbone for the purpose of releasing the membrana sternocoracoclavicularis;
   b. membrane separation means for breaking the connection between the membrane of the inner fillets and the breastbone in the region of the coracoideum;
   c. scraping means for scraping off the inner fillets from the poultry; and
   d. a carrier for fixing thereon the poultry or a part thereof, at least comprising the breast with the inner fillets attached, wherein the carrier forms part of a conveyor along whose path the separating elements, the membrane separation means and the scraping means are installed.

22. An apparatus for automatic removal of at least an inner fillet from slaughtered poultry or a part thereof, comprising:
   a carrier for fixing thereon the poultry or a part thereof, at least comprising the breast with at least a part of the wings and with the inner fillets attached; and
   shoulder joint positioning means for positioning a shoulder joint in relation to a cutting element for cutting through the processus acrocoracoideus of the shoulder joint.

23. An apparatus according to claim 22, wherein the carrier forms part of a conveyor and is composed of an elongated conical support element which is adapted to move the poultry or part thereof with the breast or the rear side thereof in the conveying direction of the conveyor, the cutting element is installed along the path of the carrier, and the shoulder joint positioning means comprise a guide which extends substantially parallel to the path of the carrier and is adapted to make contact with the shoulder joint on the side facing away from the humerus, while the cutting means are adapted for cutting from the humerus side.

24. An apparatus according to claim 23, comprising humerus positioning means for displacing the humerus in the direction of the ribs of the poultry in relation to the remainder of the shoulder joint.

25. An apparatus according to claim 24, wherein the humerus positioning means comprise a guide which extends substantially parallel to the path of the carrier and is adapted to make contact with the caput humeri and to displace the latter in the downward direction.

26. An apparatus according to claim 25, wherein the cutting element acts substantially transversely to the path of the carrier and in the horizontal direction.

* * * * *